United States Patent Office 2,880,204
Patented Mar. 31, 1959

2,880,204

3-ETHYLENE GLYCOL KETAL OF 11α-LOWER ALKYL 11β-HYDROXY-21-ACYLOXY-5,17(20)-PREGNADIENE-3-ONE

Gunther S. Fonken and John A. Hogg, Kalamazoo Township, Kalamazoo County, and Barney J. Magerlein, Kalamazoo, Mich., assignors to The Upjohn Company, Kalamazoo, Mich., a corporation of Michigan No Drawing. Application May 23, 1955
Serial No. 510,516

5 Claims. (Cl. 260—239.55)

This invention relates to 11α-lower-alkyl-hydrocortisone and 21-esters thereof, intermediates in the production thereof, and to a process for their production.

It is an object of the present invention to provide 11α-lower-alkyl-hydrocortisone, especially 11α-methyl-hydrocortisone and 21-esters thereof. Another object is the provision of novel intermediates in the production thereof. A further object is the provision of a process for the production thereof. Other objects will be apparent to those skilled in the art to which this invention pertains.

The 11α-lower-alkyl-hydrocortisone and 21-esters thereof, especially 11α-methyl-hydrocortisone and its 21-acetate, have anti-inflammatory activity and are useful in the treatment of rheumatoid arthritis and other inflammatory conditions of the skin, eyes and ears of humans and valuable domestic animals which are due to a variety of bacterial and fungal infections, contact dermatitis and other allergenic reactions.

The novel 11α-lower-alkyl-hydrocortisones and intermediates in the production thereof may be represented by the following formulae:

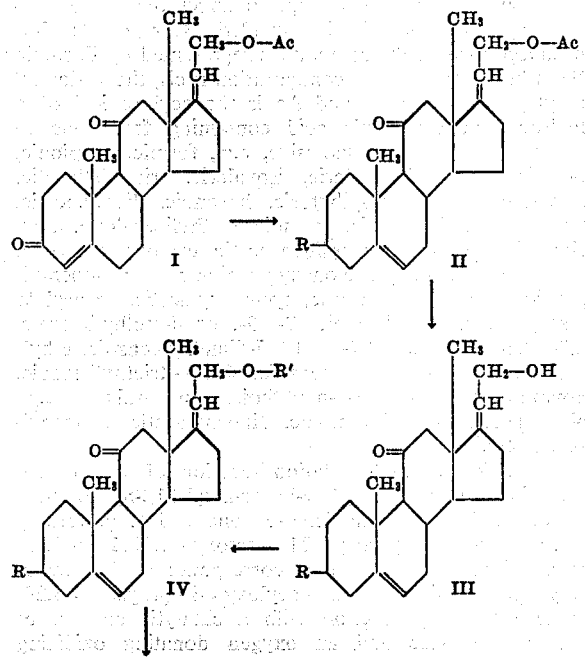

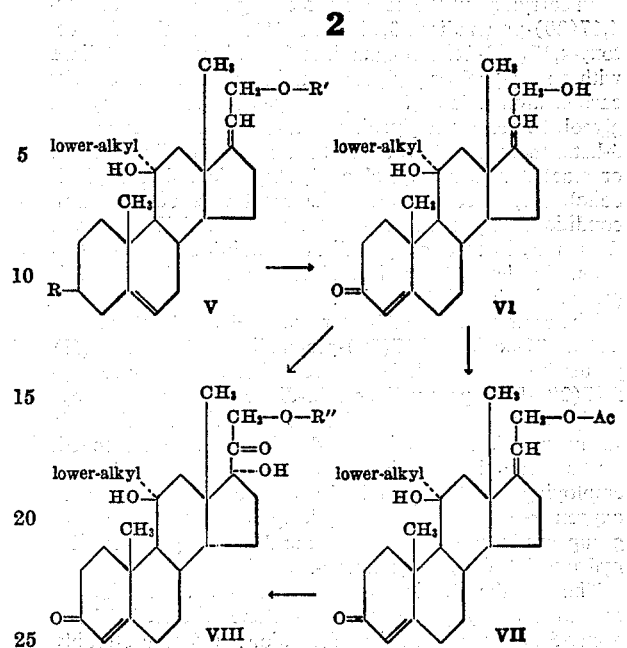

wherein Ac is the acyl radical of a hydrocarbon carboxylic acid containing from one to twelve carbon atoms, inclusive, R is a ketone protecting group, i.e., a cyclic ketal or an enol ether, R' is a hydrocarbon radical containing from one to twenty carbon atoms, and R" is hydrogen or Ac as defined above. In Formulae III and IV, when R is an enol ether group, an additional double bond in the 3(4) position is present in the molecule. The term lower-alkyl, when used herein, means alkyl containing from one to eight carbon atoms, inclusive.

The starting 21 - acyloxy - 4,17(20)-pregnadiene-3,11-dione (I) can be prepared as disclosed in the copending application of Hogg, Beal and Lincoln, S.N. 345,675, filed March 30, 1953, i.e., treatment of 11-ketoprogesterone with about a molar equivalent of sodium methoxide and an excess of diethyl oxalate in dry benzene and then brominating the thus-produced sodium enolate of 11-keto-21-ethoxyoxalylprogesterone with two molar equivalents of bromine in methanol containing potassium acetate. Reacting the dibrominated product with more than two molar equivalents of sodium methoxide in the same solvent is productive of methyl 3,11-diketo-4,17(20)-[cis]-pregnadiene-21-oate. Refluxing this compound in methanol containing sodium methoxide converts it to the trans isomer. Ketalizing the 3-keto group of either the cis or trans isomer of methyl 3,11-diketo-4,17(20)-pregnadiene-21-oate with ethylene glycol in the usual manner, followed by the reduction of the ketalized compound with lithium aluminum hydride in ether and then hydrolysis of the ketalized reduced compound with dilute hydrochloric acid in acetone at room temperature, is productive of the corresponding cis or trans isomer of 11β,21-dihydroxy-4,17(20)-pregnadiene-3-one. Esterification of the 21-hydroxy group of these compounds with the usual acylating derivatives of a hydrocarbon carboxylic acid containing from one to twelve carbon atoms, inclusive, preferably acetic acid, is productive of the corresponding cis or trans isomer of 11β-hydroxy-21-acyloxy-4,17(20)-pregnadiene-3-one. Oxidation of the 11-hydroxy group of these compounds with N-bromoacetamide in pyridine for eighteen hours or chromic acid in acetic acid and water is productive of the corresponding cis or trans isomer of 21 - acyloxy - 4,17(20)-pregnadiene-3,11-dione (I).

In the reactions described hereinbelow, the preferred compounds I–VIII have the 17(20)-cis configuration. The cis isomers of VII can be converted in higher yield to VIII than the corresponding trans isomers.

In carrying out the ketone protecting step, a 21-acyloxy-4,17(20)-pregnadiene-3,11-dione (I), preferably 21-acetoxy-4,17(20)-[cis]-pregnadiene-3,11-dione, is ketalized with an α-glycol or β-glycol containing from one to eight carbon atoms, inclusive, e.g., ethylene glycol, propylene glycol, trimethylene glycol, octane-1,2-diol, to produce the 3-ketal thereof (II) wherein R is an alkylene dioxy group, or reacted with methyl alcohol, ethyl alcohol, benzyl alcohol, octyl alcohol, under the usual enol etherification conditions, to produce a 3-enol ether thereof (II) wherein R is a hydrocarbonoxy radical containing from one to twenty carbon atoms, inclusive, and a double bond is present in the 3(4)-position.

The removal of the 21-ester group of the 3-ketone-protected 21-acyloxy-5,17(20)-pregnadiene-3,11-dione (II) preferably the 3-ethylene glycol ketal of 21-acetoxy-5,17(20)-[cis]-pregnadiene-3,11-dione, involves a hydrolysis under the usual alkaline conditions. Although strong alkali, e.g., sodium hydroxide, can be employed, we have found that satisfactory results are obtained when employing an alkali-metal bicarbonate, preferably in an oxygen-free atmosphere. Hydrolysis of the 21-acyloxy group produces the corresponding 3-ketone protected 21-hydroxy-5,17(20)-pregnadiene-3,11-dione (III).

The 21-etherification step involves the conversion of the 21-hydroxy group of a 3-ketone-protected 21-hydroxy-5,17(20)-pregnadiene-3,11-dione (III), preferably 3-ethylene glycol ketal of 21-hydroxy-4,17(20)-[cis]-pregnadiene-3,11 dione, to a 21-hydrocarbonoxy group, i.e., etherification of the 21-hydroxy group to produce the corresponding 3-ketone protected 21-hydrocarbonoxy-5,17(20)-pregnadiene-3,11-dione (IV). This can be accomplished by the usual etherification procedure, e.g., by reaction of a hydrocarbon halide or alcohol with III. The reaction is usually performed in the presence of an aromatic heterocyclic amine when a hydrocarbon halide is employed or in the presence of boron trifluoride or p-toluenesulfonic acid when an alcohol is employed. An enol ether can also be prepared by reaction of the 21-hydroxy group with a readily enolizable ketone, e.g., dihydropyran, as disclosed in U.S. Patent 2,637,728. Examples of 21-ethers which can be produced are the lower-alkyl ethers, e.g., methyl, ethyl, propyl, butyl, amyl, hexyl, heptyl, octyl, and aralkyl, e.g., benzyl, triphenylmethyl, etc.

An alternative route to a 3-ketalized-21-etherified 21-hydroxy-5,17(20)-pregnadiene-3,11-dione (IV) involves the reaction of a 3-ketal of 11β,21-dihydroxy-5,17(20)-pregnadiene-3-one with an etherifying agent as described above to produce a 3-ketal of 11β-hydroxy-21-hydrocarbonoxy - 5,17(20) pregnadiene - 3 - one and then oxidizing the 11β-hydroxy group with chromic acid in acetic acid or N-bromoacetamide in pyridine, in the usual manner.

The alkylation step involves the reaction of a 3-ketone-protected 21-hydrocarbonoxy-5,17(20)-pregnadiene-3,11-dione (IV), preferably the 3-ethylene glycol ketal of 21-triphenylmethoxy-5,17(20)-[cis]-pregnadiene - 3,11-dione, with a lower-alkyl lithium, e.g., methyl, ethyl, propyl, butyl, amyl, hexyl, heptyl or octyl lithium, preferably methyl lithium, to produce the corresponding 3-ketone-protected 11α - lower-alkyl-11β-hydroxy-21-hydrocarbonoxy-5,17(20)-pregnadiene - 3 - one (V). The lower-alkyl magnesium halides ordinarily are not reactive toward the 11-keto group whereas the lower-alkyl lithiums, and especially methyl lithium, react rapidly with ease with the 11-keto group. The usual reaction conditions for an alkylation with a lower-alkyl lithium are employed. Usually a reaction temperature of about room temperature, i.e., between twenty and thirty degrees centigrade, is employed for convenience and the good results obtained, although higher temperatures have been employed with success.

The hydrolysis step involves the removal of the 3-ketone protecting group and the 21-ether group of a 3-ketone-protected 11α-lower-alkyl - 11β - hydroxy-21-hydrocarbonoxy-5,17(20)-pregnadiene-3-one (V), preferably the 3-ethylene glycol ketal of 11α-methyl-11β-hydroxy-21-triphenylmethoxy - 5,17(20) - [cis]-pregnadiene-3-one, to produce the corresponding 11α-lower-alkyl-11β,21 - dihydroxy-4,17(20)-[cis]-pregnadiene-3-one (VI) according to methods known in the art, e.g., the starting ketone-protected steroid (V) is mixed with a hydrolyzing agent such as, for example, dilute aqueous hydrochloric acid, sulfuric acid, or other acidic hydrolyzing agent. Although both of these groups are ordinarily removed in the same reaction, their removal can be stepwise, with the 3-ketone-protecting group being removed first, if so desired. The 3-ketone protecting group is ordinarily more susceptible to hydrolysis than the 21-ether group and is therefore more rapidly hydrolyzed to produce an 11α - lower - alkyl - 11β - hydroxy - 21 - hydrocarbonoxy-4,17(20) - pregnadiene - 3 - one. A 21-tetrahydropyranyl ether, however, is hydrolyzed as rapidly or more so than the corresponding 3-ketone-protecting group, thus producing 3-ketalized a 11α-lower-alkyl-11β,21-dihydroxy-5,17(20)-pregnadiene-3-one as the intermediate compound in the hydrolysis reaction.

Esterification of an 11α-lower-alkyl-11β,21-dihydroxy-4,17(20)-pregnadiene-3-one (VI), preferably 11α-methyl-11β,21-dihydroxy-4,17(20)-[cis]-pregnadiene - 3-one with an esterifying derivative of a hydrocarbon carboxylic acid containing from one to twelve carbon atoms is productive of the corresponding 11α-lower-alkyl-11β-hydroxy-21-acyloxy-4,17(20)-pregnadiene-3-one (VII). This reaction can be performed under the esterifications known in the art, e.g., by the reaction of VI with the selected acid anhydride or acid chloride or bromide of a hydrocarbon carboxylic acid, preferably in the presence of pyridine or like tertiary aromatic amine, or by reaction with the selected acid, in the presence of an esterification catalyst or with an ester under ester exchange conditions. Reaction conditions which are apt to affect the labile 11β-hydroxy group should be avoided. Compounds thus produced include the compounds represented by Formula VII wherein the 17(20) configuration is cis, the 11-lower-alkyl group is methyl and Ac is the acyl radical of a hydrocarbon carboxylic acid containing from one to twelve carbon atoms, inclusive, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, cyclopentylformic, cyclopentylacetic, β-cyclohexylpropionic, β-cyclopentylpropionic, cyclohexylformic, cyclohexylacetic, an aryl or alkaryl acid, e.g., benzoic, 2-, 3-, or 4-methylbenzoic, 2,3-, 2,4-, 2,5-, 2,6-, 3,4- and 3,5-dimethylbenzoic, ethylbenzoic, 2,4,6 - trimethylbenzoic, 2,4,6 - triethylbenzoic, α-naphthoic, 3-methyl-α-naphthoic, an aralkyl, e.g., phenylacetic, phenylpropionic, diphenylacetic, triphenylacetic, etc.

The oxidative hydroxylation reaction of the present invention converts a 11α-lower-alkyl-11β-hydroxy-21-acyloxy-4,17(20)-pregnadiene - 3 - one (VII), preferably 11α-methyl-11β - hydroxy - 21 - acetoxy - 4,17(20) - [cis]-pregnadiene-3-one, to the corresponding 11α-lower-alkyl-11β,17α-dihydroxy-21 - acyloxy - 4 - pregnene - 3,20-dione (VIII) by reaction with a catalytic amount of osmium tetroxide and an oxygen donating oxidizing agent. Included among the oxidizing agents are hydrogen peroxide, peracids, alkyl peroxides, amine oxide peroxides, etc. The preparation of a number of these oxidizing agents and the reaction condition which are preferably employed are discussed more fully in the copending application of Lincoln and Hogg, Ser. No. 476,061, filed December 17, 1954.

A preferred procedure involves employing from about two to about three molar equivalents of the oxidizing agent and less than 0.05 molar equivalent of osmium tetroxide, calculated on the starting steriod, in tertiary butyl alcohol at about room temperature.

Substituting an 11α - lower - alkyl - 11β,21 - dihydroxy-4,17(20)-pregnadiene-3-one for the corresponding 21-acyloxy compound as the starting steroid in the oxidative hydroxylation step is productive of the corresponding 11α - lower - alkyl - 11β,17α,21 - trihydroxy - 4 - pregnene-3,20-dione.

The following preparations and examples are illustrative of the products and process of the present invention, but are not to be construed as limiting.

PREPARATION 1

*The 3-ethylene glycol ketal of 21-acetoxy-5,17(20)-[cis]-pregnadiene-3,11-dione (II)*

A solution of 0.50 gram (1.35 millimoles) of 21-acetoxy-4,17(20)-[cis]-pregnadiene-3,11-dione, prepared as disclosed in the copending application of Hogg et al., S.N. 345,675, ten milligrams of para-toluenesulfonic acid and two milliliters of ethylene glycol in 100 milliliters of benzene was refluxed for six hours with concomitant removal of the water of reaction by passing the return condensate through a bed of calcium carbide. The cooled solution was then washed with an aqueous four percent solution of sodium bicarbonate, water and then dried. The dried solution was distilled at reduced pressure leaving a yellow oil which soon crystallized. The crystals were recrystallized from a mixture of ethyl acetate and Skellysolve B (hexane hydrocarbons) to give 0.27 gram of the 3-ethylene glycol ketal of 21-acetoxy-5,17(20)-[cis]-pregnadiene-3,11-dione melting at 160 to 162 degrees centigrade and having the analysis below.

Calculated for $C_{25}H_{34}O_5$: C, 72.43; H, 8.27. Found: C, 72.11; H, 8.44.

PREPARATION 2

*The 3-ethylene glycol ketal of 21-hydroxy-5,17(20)-[cis]-pregnadiene-3,11-dione (III)*

To a solution of ten grams (0.024 mole) of the 3-ethylene glycol ketal of 21-acetoxy-5,17(20)-[cis]-pregnadiene-3,11-dione in 1,500 milliliters of absolute methanol, in a nitrogen atmosphere, was added a solution of ten grams (0.1 mole) of potassium bicarbonate in 100 milliliters of water at a temperature of about 25 degrees centigrade. The mixture was stirred for one hour and then maintained at room temperature for eighteen hours, in a nitrogen atmosphere. The mixture was distilled to a small volume at reduced pressure and then diluted with stirring with 500 milliliters of water. Crystals precipitated from the mixture which were filtered, washed with water, and dried to give 8.46 grams of the 3-ethylene glycol ketal of 21-hydroxy-5,17(20)-[cis]-pregnadiene-3,11-dione melting at 109 to 111.5 degrees centigrade. Recrystallization of this product from fifty percent aqueous methanol gave crystals melting at 113.5 to 115 degrees centigrade and having the analysis below.

Calculated for $C_{23}H_{32}O_4$: C, 74.16; H, 8.66. Found: C, 74.05; H, 8.95.

PREPARATION 3

*The 3-ethylene glycol ketal of 21-triphenylmethoxy-5,17(20)-[cis]-pregnadiene-3,11-dione (IV)*

A solution of 5.38 grams (0.144 mole) of the 3-ethylene glycol ketal of 21-hydroxy-5,17(20)-[cis]-pregnadiene-3,11-dione and 4.4 grams of triphenylmethyl chloride in seventy milliliters of dry pyridine was maintained at about 25 degree centigrade for 52 hours. The solution was then poured into a mixture of ice and water and then extracted with a 1:1 mixture of ether and benzene followed by extractions with three 100-milliliter portions of ether. The combined extracts were washed several times with water and then dried with anhydrous potassium carbonate. The dried solution was distilled to dryness leaving a glass which was crystallized from methanol to give 6.19 grams of the 3-ethylene glycol ketal of 21-triphenylmethoxy - 5,17(20) - [cis] - pregnadiene - 3,11 - dione melting at 195 to 198 degrees centigrade. Recrystallization from a mixture of ether and methanol raised the melting point to 201 to 203 degrees centigrade. These crystals had the analysis below.

Calculated for $C_{42}H_{46}O_4$: C, 82.05; H, 7.54. Found: C, 81.99; H, 7.47.

EXAMPLE 1

*The 3-ethylene glycol ketal of 11α-methyl-11β-hydroxy-21 - triphenylmethoxy - 5,17(20) - [cis] - pregnadiene-3-one (V)*

To a solution of 300 milligrams of the 3-ethylene glycol ketal of 21-triphenylmethoxy-5,17(20)-[cis]-pregnadiene-3,11-dione in five milliliters of anhydrous benzene in a dry atmosphere of nitrogen was added ten milliliters of a 0.33 molar solution of methyl lithium in anhydrous ether. The sealed container containing the solution was maintained for three days at about 25 degrees centigrade. The solution was diluted with benzene and then washed with six milliliters of a 1:5 solution of acetic acid in water and then with several portions of water. The benzene solution was dried and then distilled to dryness. The residue was chromatographed over a thirty gram column of Florisil (synthetic magnesium silicate). The column was developed with sixty-milliliter portions of Skellysolve B (hexane hydrocarbons) containing increasing proportions of acetone. A 294 milligram yield of the 3-ethylene glycol ketal of 11α-methyl-11β-hydroxy-21-triphenylmethoxy-5,17(20)-[cis]-pregnadiene-3-one was eluted from the column with Skellysolve B plus five percent acetone. The thus-purified material was recrystallized from a mixture of ethyl acetate and methanol to give product melting at 182 to 184 degrees centigrade and having the analysis below.

Calculated for $C_{43}H_{50}O_4$: C, 81.87; H, 7.93. Found: C, 81.90; H, 7.95.

EXAMPLE 2

*11α-methyl-11β,21-dihydroxy-4,17(20)-[cis]-pregnadiene-3-one (VI)*

A suspension of 200 milligrams (0.32 millimole) of the 3-ethylene glycol ketal of 11α-methyl-11β-hydroxy-21-triphenylmethoxy-5,17(20)-pregnadiene-3-one in twenty milliters of methanol containing one milliliter of 1 N hydrochloric acid was stirred at room temperature for two days, during which time the suspended solid gradually dissolved. The solution was mixed with fifteen milliliters of 1.3 percent aqueous sodium bicarbonate and then evaporated to dryness. The residue was triturated with thirty milliliters of benzene. The benzene solution was poured over a thirty gram column of Florisil (synthetic magnesium silicate). The column was developed with sixty milliliter portions of solvent of the following composition and order: six of Skellysolve B (hexane hydrocarbons), six of Skellysolve B plus five percent acetone, six of Skellysolve B plus ten percent acetone, six of Skellysolve B plus 25 percent acetone and six of acetone. The middle four Skellysolve B plus 25 percent acetone eluate fractions contained 78 milligrams of 11α-methyl-11β,21 - dihydroxy - 4,17(20) - [cis] - pregnadiene - 3 - one which, when recrystallized from ethyl acetate, melted at 188 to 192 degrees centigrade and had the analysis below.

Calculated for $C_{22}H_{32}O_3$: C, 76.70; H, 9.36. Found: C, 76.31; H, 9.50.

EXAMPLE 3

*11β-hydroxy-11α-methyl-21-acetoxy-4,17(20)-[cis]-pregnadiene-3-one (VII)*

A solution of about 2000 milligrams of 11β,21-dihydroxy-11α-methyl-4,17(20) - [cis] - pregnadiene-3-one in 25 milliliters of pyridine was mixed with 25 milliliters of acetic anhydride and the whole was then maintained at room temperature for three days whereafter the mixture was poured over crushed ice. The precipitated oily 11β-hydroxy-11α-methyl - 21 - acetoxy - 4,17(20)-[cis]-pregnadiene-3-one was recovered by extraction with methylene chloride and then chromatographed over a column of fifty grams of Florisil (synthetic magnesium silicate). The column was developed with 350-milliliter portions of Skellysolve B (hexane hydrocarbons) containing increasing percentages of acetone. The eluate fractions containing seven percent acetone eluted 1.994 grams of 11β - hydroxy - 11α - methyl - 21 - acetoxy-4,17(20)-[cis]-pregnadiene-3-one which, when crystallized from a mixture of ethyl acetate and Skellysolve B, melted at 107–113 degrees centigrade.

Similarly, other 21-organic carboxylic acid esters of 11β,21 - dihydroxy - 11α - methyl - 4,17(20) - [cis]-pregnadiene-3-one are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 11β,21-dihydroxy-11α-methyl - 4,17(20) - pregnadiene - 3 - one with an appropriate acylating agent, e.g., the anhydride or acid halide of the selected acid in a solvent such as, for example, benzene, toluene, acetic acid, or the like.

EXAMPLE 4

*11α-methyl-11β,17α-dihydroxy-21-acetoxy-4-pregnene-3,20-dione (VIII)*

To a solution of 681 milligrams of 11α-methyl-11β-hydroxy-21-acetoxy-4,17(20) - [cis] - pregnadiene-3-one dissolved in 33.5 milliliters of tertiary butyl alcohol was added 0.4 milliliter of pyridine followed by a solution of 730 milligrams of N-methylmorpholine oxide peroxide in 3.47 milliliters of tertiary butyl alcohol and 0.56 milligram of osmium tetroxide in 1.02 milliliters of tertiary butyl alcohol. The N-methylmorpholine oxide peroxide was prepared by the reaction of N-methylmorpholine with two molar equivalents of hydrogen peroxide in tertiary butyl alcohol. The mixture was maintained at about 25 degrees centigrade for twenty-five hours and then mixed with 370 milligrams of Magnesol filter aid and 9.2 milliliters of aqueous 0.5 percent sodium hydrosulfite solution. After one-half hour the mixture was filtered and most of the tertiary butyl alcohol distilled from the filtrate at reduced pressure and at a temperature less than sixty degrees centigrade. The concentrate was diluted with about 35 milliliters of water and extracted with four 25-milliliter portions of methylene chloride. The combined extracts were washed with sixty milliliters of water, filtered through anhydrous sodium sulfate and concentrated to dryness at reduced pressure. The resultant oil was redissolved in methylene chloride and chromatographed over a column of fifty grams of acid-washed alumina, the height: diameter ratio of the column being about 4:1. Elution was carried out by a solvent gradient technique. The initial eluting solvent was methylene chloride. The initial volume of solvent in the reservoir above the column was 1,000 milliliters. This volume was maintained constant by the gradual addition of 800 milliliters of methylene chloride plus twenty percent acetone. When this solvent had all been added to the reservoir, 800 milliliters of methylene chloride plus sixty percent acetone was added to the reservoir in the same manner. When this solvent had all been added to the reservoir, the solvent gradient elution of the column was stopped, the solvent remaining in the reservoir discarded and the column was stripped with methanol. The desired product was obtained by evaporation of the 1,150 milliliters of eluates which immediately preceded the methanol eluates. The 268 milligrams of crude product thus obtained was crystallized from ethyl acetate to give 11α-methyl-11β,17α-dihydroxy-21-acetoxy-4-pregnene-3,20-dione melting at 192 to 197 degrees centigrade.

EXAMPLE 5

*11α-methyl-11β,17α,21-trihydroxy-4-pregnene-3,20-dione (VIII)*

A solution of 418 milligrams of 11α-methyl-hydrocortisone acetate in four milliliters of methanol was freed of oxygen gas by bubbling nitrogen therethrough. A solution of 404 milligrams of potassium bicarbonate in four milliliters of water was similarly freed of oxygen. The two solutions were mixed at a temperature of between eighteen and twenty degrees centigrade and in a nitrogen atmosphere. The temperature of the solution rose to between 24 and 26 degrees centigrade. The mixture was stirred at room temperature for five hours while protecting it from atmospheric oxygen with nitrogen. At the end of five hours the solution was neutralized with very dilute acetic acid. The neutralized solution was concentrated by distillation at room temperature and then chilled in a refrigerator for about sixteen hours. The thus-precipitated 11α-methyl-hydrocortisone was filtered, washed with ice water and then dried.

11α-methyl-hydrocortisone can also be prepared by substituting 11α-methyl - 11β,21 - dihydroxy - 4,17(20)-[cis]-pregnadiene-3-one as the starting steroid in Example 4.

It is to be understood that the invention is not to be limited to the exact details of operation described, as obvious modifications and equivalents will be apparent to one skilled in the art, and the invention is therefore to be limited only by the scope of the appended claims.

We claim:

1. 3-cyclic ketal-21-hydrocarbon ethers of 11α-lower-alkyl-11β,21 - dihydroxy - 5,17(20) - pregnadiene - 3-one represented by the following formula:

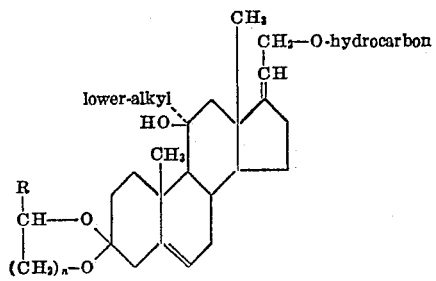

wherein R is selected from the group consisting of hydrogen and lower-alkyl, n is a whole number from one to two, and the 21-hydrocarbonoxy radical contains from one to twenty carbon atoms, inclusive.

2. The 3-ethylene glycol ketal of 11α-methyl-11β-hydroxy-21-triphenylmethoxy - 5,17(20)-[cis]-pregnadiene-3-one.

3. The process which comprises alkylating a compound selected from the group consisting of 3-cyclic ketals and 3-enol ethers of 21-hydrocarbonoxy-5,17(20)-pregnadiene-3,11-dione with a lower-alkyl lithium compound to produce the corresponding 11α-lower-alkyl-11β-hydroxy compound.

4. The process of claim 3 wherein the lower-alkyl lithium compound is methyl lithium.

5. The process of claim 3 wherein the lower-alkyl lithium is methyl lithium and the starting steroid is the 3-ethylene glycol ketal of 21-triphenylmethoxy-5,17(20)-[cis]-pregnadiene-3,11-dione.

References Cited in the file of this patent
UNITED STATES PATENTS

| | | |
|---|---|---|
| 2,707,184 | Hogg et al. | Apr. 26, 1955 |
| 2,713,061 | Kathol | July 12, 1955 |
| 2,713,062 | Junkmann | July 12, 1955 |